April 1, 1941.      C. C. SCHUETZ      2,236,582
METHOD OF FORMING A DECORATIVE SLAB
Filed June 19, 1937
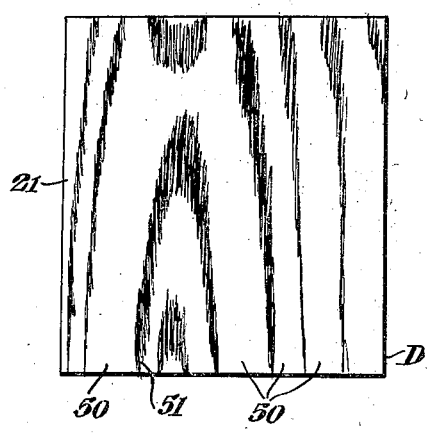
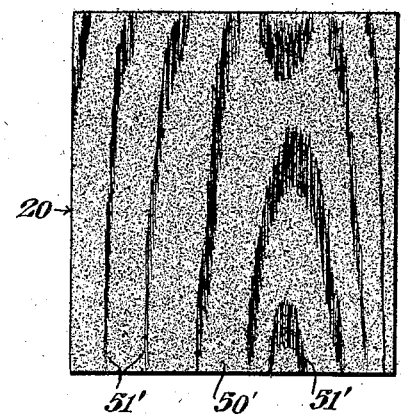
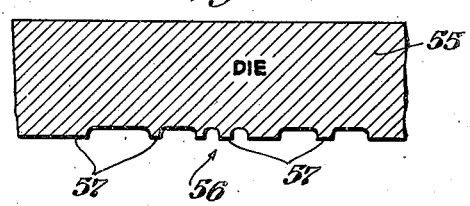
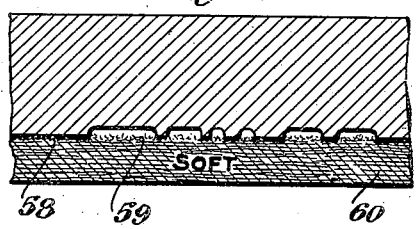
INVENTOR
Clyde C. Schuetz
BY
Edwards, Bower & Wool
ATTORNEYS Patented Apr. 1, 1941

2,236,582

UNITED STATES PATENT OFFICE 2,236,582

METHOD OF FORMING A DECORATIVE SLAB

Clyde C. Schuetz, Chicago, Ill., assignor to Keasbey & Mattison Company, Ambler, Pa., a corporation of Pennsylvania Application June 19, 1937, Serial No. 149,048

1 Claim. (Cl. 18—61)

This invention relates to asbestos cement for panels, sheeting, wall board and the like and particularly to the decorative surfacing of such material.

The object of the invention is to provide asbestos cement material having a surface coloring adapted to simulate a wide variety of natural products such as wood, thatch, marble and the like.

Further objects of the invention particularly in the methods used to effect the surfacing will appear from the following specification taken in connection with the accompanying drawing in which, Figs. 1 to 3 inclusive are sectional views illustrating one method of forming the decorative surface;

Fig. 4 is a face view of a decorative die;

Fig. 5 is a face view of a section of asbestos cement material showing the finished sheet corresponding to the die of Fig. 4; and Figs. 6 to 9 inclusive are sectional views illustrating a further modified method of producing surface decoration in asbestos cement material.

In the specific embodiment of the invention shown in Figs. 1 to 3 a sheet 37 of asbestos cement material is provided in unhardened plastic form, preferably laminated and fresh from the accumulator roll of Hatschek type of apparatus. This sheet 37 is placed on a filter bed and pressed by the die 36, having its lower surface formed, for instance, with grooves and ridges corresponding to wood graining or other decorative form. When the die 36 is pressed against the plastic sheet 37, the surface of the plastic sheet is forced to conform to the surface of the die as indicated in Fig. 1. Before pressing the die and sheet together the die is provided on its lower surface with a color 38 in the hollows of the surface grooves and the desired colors may be applied in either dry or wet form by first covering the surface of the die with a liquid film carrying the color. Excess color is then removed from the high points of the die, which is then pressed against the sheet 37. In this way the color 38 which is present in the low points of the die is transferred to the high points of the finished product at the same time that the soft plastic surface of the sheet is forced into conformance with the textured die surface.

Another alternative method is to press the plastic sheet against the textured die without resorting to full final pressure but using sufficient pressure to produce the texture. Then the plastic sheet is removed from the die and dry color added to the valleys of the semi-finished product. If, for instance, a black veneer sheet 40 (Fig. 2) is pressed the valleys may be filled with green oxide mixed with Portland cement, the excess being wiped, blown or otherwise removed from the high points 41. The sheet is then repressed against the die 42 (Fig. 2) in such manner as to insure accurate re-register of the panel and the color will be pressed into the valleys with very intimate bonding between the Portland cement of the color and the Portland cement of the asbestos cement material.

Instead of using the same die for the second and final pressure, a flat surface die such as 44 (Fig. 3) may be used to give a flat final surface with the color 45 pressed into the surface of the plastic material. The simulation of wood or other effects will in this modification be by means of color only without assistance by any actual depth of the graining of the design.

In Fig. 4 is shown a textured die D similar to the textured die used in the procedures of Figs. 1 and 2, this die having for instance depressed portions 50 corresponding to the lighter parts of the wood and raised portions 51 corresponding to the darker graining of the wood. In Fig. 5 is shown a finished asbestos cement sheet conforming in decoration to the die D of Fig. 4 and reflecting the grooves and depressions so that the raised lighter portions 50' and the depressed darker portions 51' simulate the wood graining in coloring and in displacing the darker portions down into the material of the sheet.

A flat surface wood grain may be attained with a die such as die 55 of Fig. 6 having a textured surface 56 with raised portions 57 corresponding to the lighter portions of the wood. A thin coat of dry color 58 is applied to the surface 59 of the laminated plastic asbestos cement sheet 60 and the die 55 has its textured surface lightly pressed against the coloring 58 in such manner that the color is compressed and wetted only at the high points 57 of the die. The unpressed color is blown or brushed away as indicated in Fig. 8, leaving the adhering color corresponding to the die pressure. Final pressure may then be applied between steel plates or against a flat die as indicated in Fig. 9 so as to imbed the color in the surface of the plastic material.

I claim:

The method of forming a decorative slab or sheet of asbestos cement material comprising providing said sheet as a wet plastic slab of predetermined color throughout, providing a die having an ornamental ridged surface, applying powdered coloring matter to said ornamental ridged surface of said die, transferring said coloring matter to selected areas of the surface of said plastic sheet in conformance with the ornamentation of said die and with the bare surfaces of said sheet intervening between said areas of coloring, pressing the entire surface of said plastic sheet with a second die having a flat surface so as to force the deposited coloring matter into the plastic slab and bring the coloring and slab to the same surface level, and then permitting the slab to harden with the ornamental coloring inlaid in its surface.

CLYDE C. SCHUETZ.